United States Patent
Shatters

(10) Patent No.: US 12,190,485 B2
(45) Date of Patent: Jan. 7, 2025

(54) VARIABLE DISTORTION CORRECTION FOR PANORAMIC IMAGES

(71) Applicant: Caterpillar Inc., Peoria, IL (US)

(72) Inventor: Aaron R. Shatters, Montgomery, IL (US)

(73) Assignee: Caterpillar Inc., Peoria, IL (US)

(*) Notice: Subject to any disclaimer, the term of this patent is extended or adjusted under 35 U.S.C. 154(b) by 206 days.

(21) Appl. No.: 17/867,474

(22) Filed: Jul. 18, 2022

(65) Prior Publication Data

US 2024/0020801 A1    Jan. 18, 2024

(51) Int. Cl.
*G06T 5/80* (2024.01)
*G06T 5/50* (2006.01)
*H04N 7/18* (2006.01)
*H04N 23/698* (2023.01)

(52) U.S. Cl.
CPC .................. *G06T 5/80* (2024.01); *G06T 5/50* (2013.01); *H04N 23/698* (2023.01); *G06T 2207/30252* (2013.01); *H04N 7/18* (2013.01)

(58) Field of Classification Search
CPC ............ H04N 7/18; H04N 23/698; G06T 2207/30252; G06T 5/50; G06T 5/80
See application file for complete search history.

(56) References Cited

U.S. PATENT DOCUMENTS

| 8,355,598 | B2 | 1/2013 | Kawasaki |
| 10,169,844 | B2 | 1/2019 | Andreopoulos et al. |
| 10,388,001 | B2 | 8/2019 | Kim |
| 10,547,849 | B1 * | 1/2020 | Bellows ............... G06T 5/80 |

FOREIGN PATENT DOCUMENTS

| CN | 108564551 B | 9/2018 |
| CN | 111199528 A | 5/2020 |
| WO | 2018214365 A1 | 11/2018 |

* cited by examiner

*Primary Examiner* — On S Mung
(74) *Attorney, Agent, or Firm* — Procopio, Cory, Hargreaves & Savitch LLP

(57) ABSTRACT

In panoramic video captured by a fisheye camera (e.g., for use in the remote operation of mobile equipment), there is a trade-off between the field of view and the level of distortion correction. In particular, to avoid the video from be disorienting, distortion correction is required. However, distortion correction applied to a very wide field of view results in an unnatural appearance of objects in edge regions, such that the image frames of the video must be cropped. A method is disclosed that varies the level of distortion correction that is applied to pixels in each image frame based on a position of those pixels in the image frame, such that less distortion correction is applied to pixels closer to edges of the image frame. This enables a very wild field of view, while preventing the unnatural appearance of objects near the edges of the image frame.

20 Claims, 6 Drawing Sheets

006
VARIABLE DISTORTION CORRECTION FOR PANORAMIC IMAGES

TECHNICAL FIELD

The embodiments described herein are generally directed to distortion correction in images, and, more particularly, to variable distortion correction for panoramic images.

BACKGROUND

Mobile equipment may comprise one or more cameras that are positioned and mounted to capture video of one or more areas around the mobile equipment. When operating the mobile equipment from within the vehicle cabin, the operator can use the video from these cameras to view hard-to-see areas, such as those to the rear and/or sides of the mobile equipment. When operating the mobile equipment remotely from a remote terminal, these cameras may serve the same purpose but should also include a forward-facing camera so that the remote operator can view the area in front of the mobile equipment.

It is generally desirable to minimize the number of cameras. One reason is the cost of additional cameras, as well as their associated mounting provisions and wiring. Another reason is that an operator has limited ability to efficiently consume and process the information provided by additional camera views.

However, it also desirable to provide a full 360-degree field of view (FOV) of the area surrounding the mobile equipment, without blind spots between the individual fields of view of the cameras. For this reason, the cameras are often very wide-angle cameras (e.g., fisheye cameras) that each have a 120-degree field of view or greater. The problem with using such wide-angle cameras is that they create panoramic images that are distorted relative to a standard rectilinear projection. This results in the appearance of straight lines in the real world as curved lines in the video.

This fisheye distortion can be disorienting to the operator when the mobile equipment is moving relative to its environment. While the distorted panoramic image frames of the video can be corrected using rectilinear projection (e.g., according to the Scaramuzza fisheye camera model), a very wide field of view, when corrected by rectilinear projection, looks unnatural, especially near the edges of the image frames. Thus, the image frames are typically cropped after correction, which reduces the field of view present in the video. In other words, there is a trade-off between image distortion and field of view. To increase the field of view, distortion correction must be scaled back, and to decrease image distortion, the field of view must be reduced. However, in the case of remote operation of mobile equipment, using, for example, a forward-facing fisheye camera, it would be ideal to have both a wide field of view and very low image distortion in the regions of the image frames in which the mobile equipment is able to travel.

Chinese Patent Pub. No. 111199528A, Chinese Patent Pub. No. 108564551B, and International Patent Pub. No. WO/2018/214365A1 each disclose a method for distortion correction using pixel correction maps. However, none of these references address the trade-off between the level of distortion correction and the size of the field of view. In particular, none of these references disclose a means for obtaining both a wide field of view and very low image distortion in the regions of image frames in which a mobile equipment can travel.

The present disclosure is directed toward overcoming one or more of the problems discovered by the inventor.

SUMMARY

In an embodiment, a method comprises using at least one hardware processor to execute a process that includes, for each of a plurality of final pixel coordinates in a final image frame to be generated from an input image frame that was captured by a camera: determining at least one weighting factor to be used based on the final pixel coordinate in the final image frame; identifying an input pixel coordinate in the input image frame, based on a distortion model and the determined at least one weighting factor; generating a pixel value based on the identified input pixel coordinate in the input image frame; and adding the generated pixel value at the final pixel coordinate in the final image frame.

In an embodiment, a mobile equipment comprises: at least one camera that captures video including a plurality of input image frames; and at least one hardware processor that, for each of a plurality of final pixel coordinates in a final image frame to be generated from each of the plurality of input image frames, determines at least one weighting factor to be used based on the final pixel coordinate in the final image frame, identifies an input pixel coordinate in the input image frame, based on a distortion model and the determined at least one weighting factor, generates a pixel value based on the identified input pixel coordinate in the input image frame, and adds the generated pixel value at the final pixel coordinate in the final image frame.

In an embodiment, a non-transitory computer-readable medium has instructions stored thereon, wherein the instructions, when executed by a processor, cause the processor to, for each of a plurality of final pixel coordinates in a final image frame to be generated from an input image frame that was captured by a camera: determine at least one weighting factor to be used based on the final pixel coordinate in the final image frame; identify an input pixel coordinate in the input image frame, based on a distortion model and the determined at least one weighting factor; generate a pixel value based on the identified corresponding input pixel coordinate in the input image frame; and add the generated pixel value at the final pixel coordinate in the final image frame.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
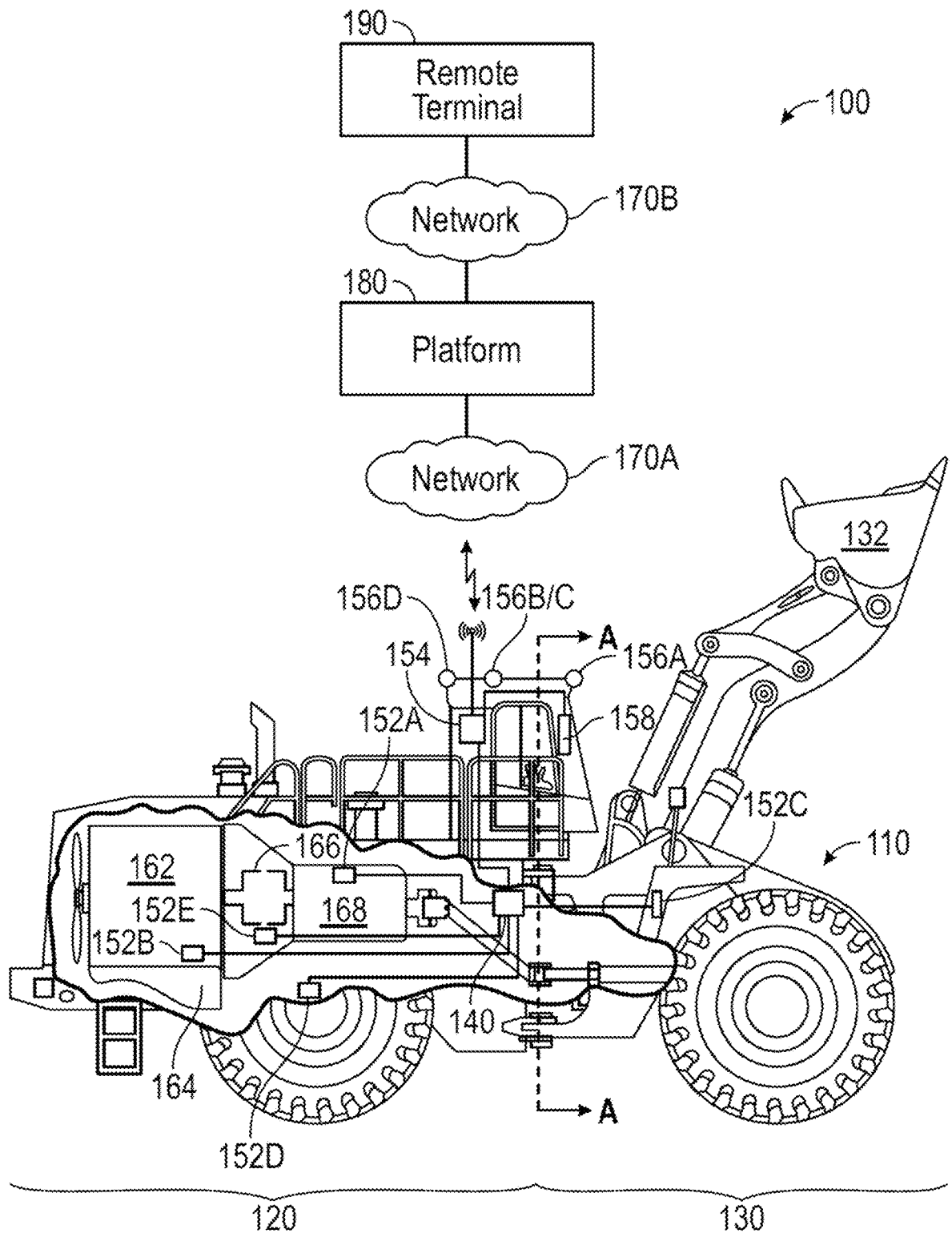
FIG. 1 illustrates a machine environment, according to an embodiment.

FIG. 1 illustrates a machine environment 100, according to an embodiment. Machine environment 100 may include an environment in which one or more mobile equipment 110 perform a task associated within an industry, such as mining, construction, transportation, energy exploration, farming, or the like. For example, machine environment 100 could include one or more mine sites in which a plurality of mobile equipment 110 cooperate to perform a task associated with mining. However, it should be understood that disclosed embodiments are not limited to any particular environment. In addition, while mobile equipment 110 is illustrated as a wheel loader, it should be understood that mobile equipment 110 may be any type of mobile equipment, including a dump truck, asphalt paver, backhoe loader, skid steer, track loader, cold planer, compactor, dozer, electric rope shovel, excavator, forest machine, hydraulic mining shovel, material handler, motor grader, pipe-layer, road reclaimer, telehandler, tractor-scraper, or the like, as well as ordinary road vehicles (e.g., automobiles, semi-trucks, etc.), aircraft, or maritime vessels (e.g., boats, ships, barges, etc.).

In the illustrated example, mobile equipment 110 comprises a rear portion 120 and a front portion 130 that comprises a work implement 132. Front portion 130 may be articulated with respect to rear portion 120, such that front portion 130 is capable of rotating within a range of degrees, relative to rear portion 120, around an axis A. However, it should be understood that disclosed embodiments do not require mobile equipment 110 to comprise an articulated front portion 130. In an alternative example, mobile equipment 110 may comprise non-articulated front and rear portions (e.g., a single, integrated body frame).

Mobile equipment 110 may comprise an electronic control unit (ECU) 140 that is communicatively coupled to one or a plurality of sensors 152A-E (which may be collectively referred to herein as sensor(s) 152) and/or subsystems of mobile equipment 110. ECU 140 may collect data from sensor(s) 152 and/or subsystems and process the collected data. Processing the collected data may comprise determining one or more machine states from the collected data, generating an alert based on the collected data (e.g., if a value of a parameter in the data satisfies a predefined threshold), filtering, analyzing, sorting, correlating, storing, and/or relaying the collected data, and/or the like. ECU 140 may also control the operation of one or more subsystems of mobile equipment 110 based on the collected data and/or operator commands. For example, ECU 140 may be communicatively coupled to a fuel injection system associated with a combustion engine 162 of mobile equipment 110. ECU 140 may receive an operator command (e.g., increase throttle) and provide command signals to the fuel injection system of combustion engine 162, which may responsively increase the flow of fuel from fuel supply 164 to combustion engine 162. Combustion engine 162 may be connected to a torque converter 166 that transmits power from combustion engine 162 to transmission 168.

Sensor(s) 152 may include any type of sensor or sensor array capable of measuring values of one or more parameters of one or more subsystems of mobile equipment 110. Examples of such parameters include, without limitation, engine speed, machine speed, location of mobile equipment 110 (e.g., coordinates acquired via a global navigation satellite system (GNSS), such as the Global Positioning System (GPS)), pressure of a fluid (e.g., fuel, oil, coolant, etc.), flow rate of a fluid, temperature of a fluid, contamination level of a fluid, viscosity of a fluid, electric current, electric voltage, fluid consumption rates, loading level, transmission output ratio, slip, grade, traction, mileage, time or mileage until or since scheduled maintenance, and/or the like.

Mobile equipment 110 may comprise a communication module 154, which may be separate or integral to ECU 140. Communication module 154 may comprise hardware and/or software that enables communication between communication module 154 and an access point of a network 170A. For example, communication module 154 may comprise or be connected to a processor, network interface, and wireless transceiver with an antenna that enables wireless communication with a base station of a cellular network. Communication module 154 may send data to a platform 180 and/or receive data from platform 180 via network 170A. For example, ECU 140 may transmit any of the data that is collected or derived from collected data to platform 180 via communication module 154, as well as receive data, such as control commands, from platform 180 via communication module 154.

Mobile equipment 110 may comprise one or more cameras 156A-D (which may be collectively referred to herein as camera(s) 156). Each camera 156 captures video of a field of view of an area around mobile equipment 110. For example, a forward-facing camera 156A captures a front field of view of an area in front of mobile equipment 110, a right-side-facing camera 156B captures a right field of view of an area to the right of mobile equipment 110, a left-side-facing camera 156C captures a left field of view of an area to the left side of mobile equipment 110, and a rear-facing camera 156D captures a rear field of view of an area in the rear of mobile equipment 110. One or more of cameras 156 may be very wide-angle cameras with a field of view of 120-degrees or greater (e.g., between 120-degrees and 180-degrees). Different cameras 156 may have the same sized or differently sized fields of view. For example, right-side-facing camera 156B and left-side-facing camera 156C may have the same field of view as each other, but have a different field of view than forward-facing camera 156A and/or rear-facing camera 156D. Similarly, forward-facing camera 156A may have a narrower field of view than right-side-facing camera 156B, left-side-facing camera 156C, and rear-facing camera 156D, since fisheye distortion may be more problematic in video from forward-facing camera 156A. In an embodiment, each camera 156 has a maximum field of view that can be narrowed by mechanical, electronic, and/or software means, including in the captured video by software-based correction to eliminate fisheye distortion (e.g., using rectilinear projection). Thus, the field of view that appears in the final video (i.e., intended for viewing by an operator) from each camera 154 may represent the maximum field of view or some angle less (e.g., less than 120-degrees) than the maximum field of view.

Each camera 156 may stream or otherwise transmit the captured video, comprising a plurality of image frames, to platform 180 via communication module 154. Camera(s) 156 may transmit the video directly to communication module 154. Alternatively, camera(s) 156 may transmit the video to ECU 140, which may relay the video in real time (e.g., with or without pre-processing) to platform 180 through communication module 154. As used herein, the term "real time" encompasses events that occur simultaneously, as well as events that are separated by ordinary delays resulting from processing latencies, network latencies, and/or the like.

Mobile equipment 110 may comprise a display console 158. Display console 158 may comprise a plasma display, light-emitting diode (LED) display, liquid crystal display (LCD), and/or the like. In an embodiment, display console 158 may comprise an integrated touch sensor to form a touch panel display which may both display data and receive touch inputs at positions on the display from an operator within the cabin of mobile equipment 110. Alternatively or additionally, display console 158 may receive inputs via other input means, such as keyboards, in-cabin cameras, biometric sensing devices, computer mice, trackballs, pen-based pointing devices, and/or the like. Display console 158 may be communicatively coupled to ECU 140, communication module 154, and/or camera(s) 156. Thus, display console 158 may display a graphical user interface which enables an operator in the cabin of mobile equipment 110 to view data collected by ECU 140 (e.g., real-time values of parameters of one or more subsystems of mobile equipment 110), data derived from data collected by ECU 140 (e.g., machine states, alerts, graphs, charts, tables, etc.), and/or data received from platform 180 via communication module 154, view video captured by camera(s) 156, interact with one or more software applications executed on-board mobile equipment 110 (e.g., within ECU 140), perform an audio or audiovisual communication with another person, and/or the like. Thus, an operator in the cabin of mobile equipment 110 may utilize display console 158 to view the surroundings of mobile equipment 110 via camera(s) 156, access operator assistance tools, receive alerts, dispatch information, operational instructions, and/or recommendations, review environmental data (e.g., weather, temperature, soil conditions, etc.), payload information, productivity data, and/or any other type of information, control one or more subsystems of mobile equipment 110 via commands to ECU 140, initiate or receive an audio or audiovisual call, and/or the like.

In an embodiment, video captured by camera(s) 156 is relayed (e.g., with or without pre-processing) to an external system, and, in the illustrated embodiment, through platform 180 to a remote terminal 190. Platform 180 may host and/or execute one or more of the various functions, processes, methods, and/or software modules described herein. Platform 180 may comprise dedicated servers or may instead be implemented in a computing cloud, so as to utilize shared resources of one or more servers. These servers may be collocated and/or geographically distributed. Platform 180 may be communicatively connected to mobile equipment 110 via network 170A and/or a remote terminal 190 via network 170B. Networks 170A and 170B (which may be collectively referred to herein as network 170) may be the same network, separate and distinct networks, or overlapping networks, and may include one or more cellular networks, one or more satellite networks, the Internet, one or more intranets, and/or the like. While only a single instance of mobile equipment 110 and a single instance of remote terminal 190 are illustrated, it should be understood that platform 110 may be communicatively coupled to any number of mobile equipment 110 and remote terminals 190.

Platform 180 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 180 transmits or serves one or more screens of the graphical user interface in response to requests from mobile equipment 110 via network 170A and/or remote terminal 190 via network 170B. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like.

In embodiments in which a web service is provided, platform 180 may receive requests from external systems, and provide responses in eXtensible Markup Language (XML), JavaScript Object Notation (JSON), and/or any other suitable or desired format. In such embodiments, platform 180 may provide an application programming interface (API) (e.g., implemented in a Representation State Transfer (REST) architecture) which defines the manner in which mobile equipment 110, remote terminal 190, and/or other external system(s) may interact with the web service. Thus, mobile equipment 110, remote terminal 190, and/or other external systems (which may themselves be servers), can define their own user interfaces, and rely on the web service to implement or otherwise provide the backend processes, methods, functionality, storage, and/or the like, described herein. For example, in such an embodiment, a client application, executing on remote terminal 190, may interact with platform 180 to execute one or more or a portion of one or more of the various functions, processes, methods, and/or software modules described herein. In this case, the client application may generate the graphical user interface and access functionality on platform 180 via the API.

Remote terminal 190 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that remote terminal 190 is a remote operating station by which a remote operator can operate mobile equipment 110 through platform 180. In an alternative embodiment, remote terminal 190 may communicate directly with mobile equipment 110 (i.e., without platform 180 acting as intermediary) to operate mobile equipment 110. In either case, remote terminal 190 may comprise one or more displays that display, in real time, video captured by camera(s) 156 and transmitted by communication module 154 of mobile equipment 110. Remote terminal 190 may also comprise one or more input devices that enable an operator to provide operating controls to mobile equipment 110. These operating controls may be transmitted as control commands, directly or via platform 180, to communication module 154, which may relay the control commands to ECU 140. ECU 140 may responsively control the appropriate subsystem of mobile equipment 110 in accordance with the control commands. In general, for safety reasons, each remote terminal 190 should control one mobile equipment 110 at a time. However, this is not a requirement of any embodiment.

Figure 2:
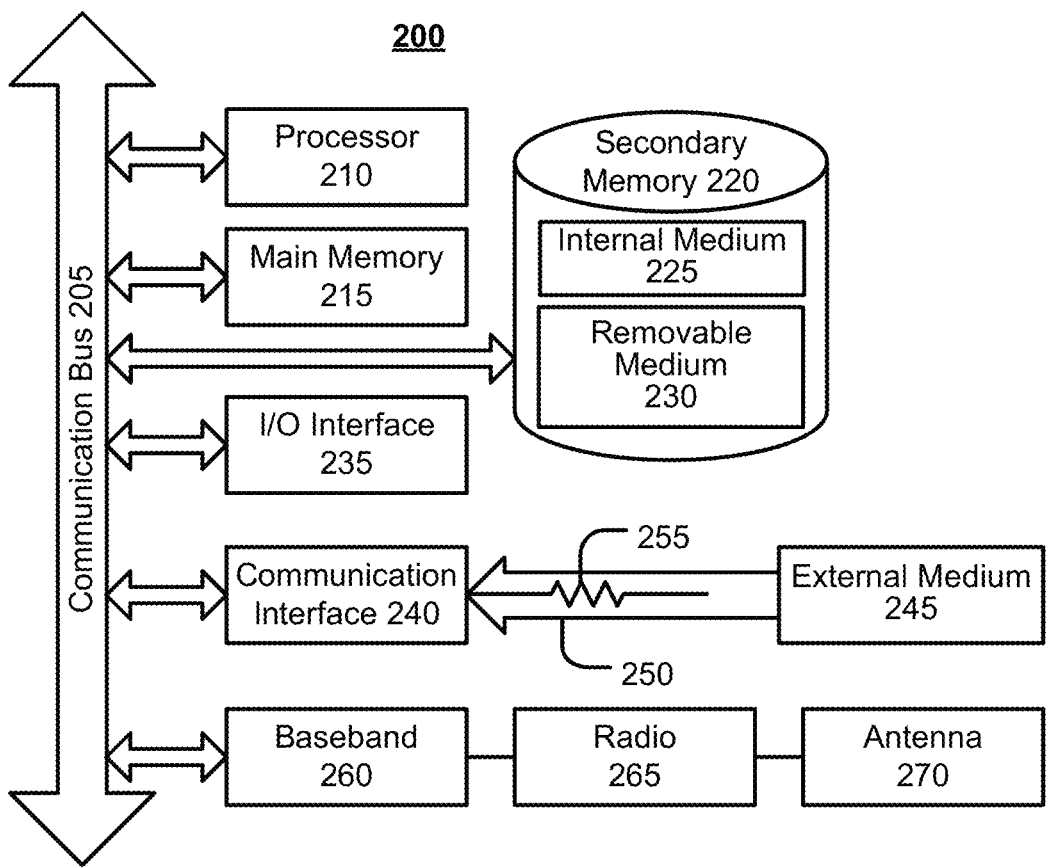
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of mobile equipment 110 (e.g., ECU 140, communication module 154, camera(s) 156, display console 158, etc.), platform 180, remote terminal 190, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console 158, or in a smartphone, tablet computer, or other mobile device).

System 200 may include a communication interface 240. Communication interface 240 allows software and data to be transferred between system 200 and external devices (e.g. printers), networks (e.g., network(s) 170), or other information sources. For example, computer software or executable code may be transferred to system 200 from a network server (e.g., platform 180) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 170) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 170), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network. The wireless communication components (e.g., corresponding to communication module 154) comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3:
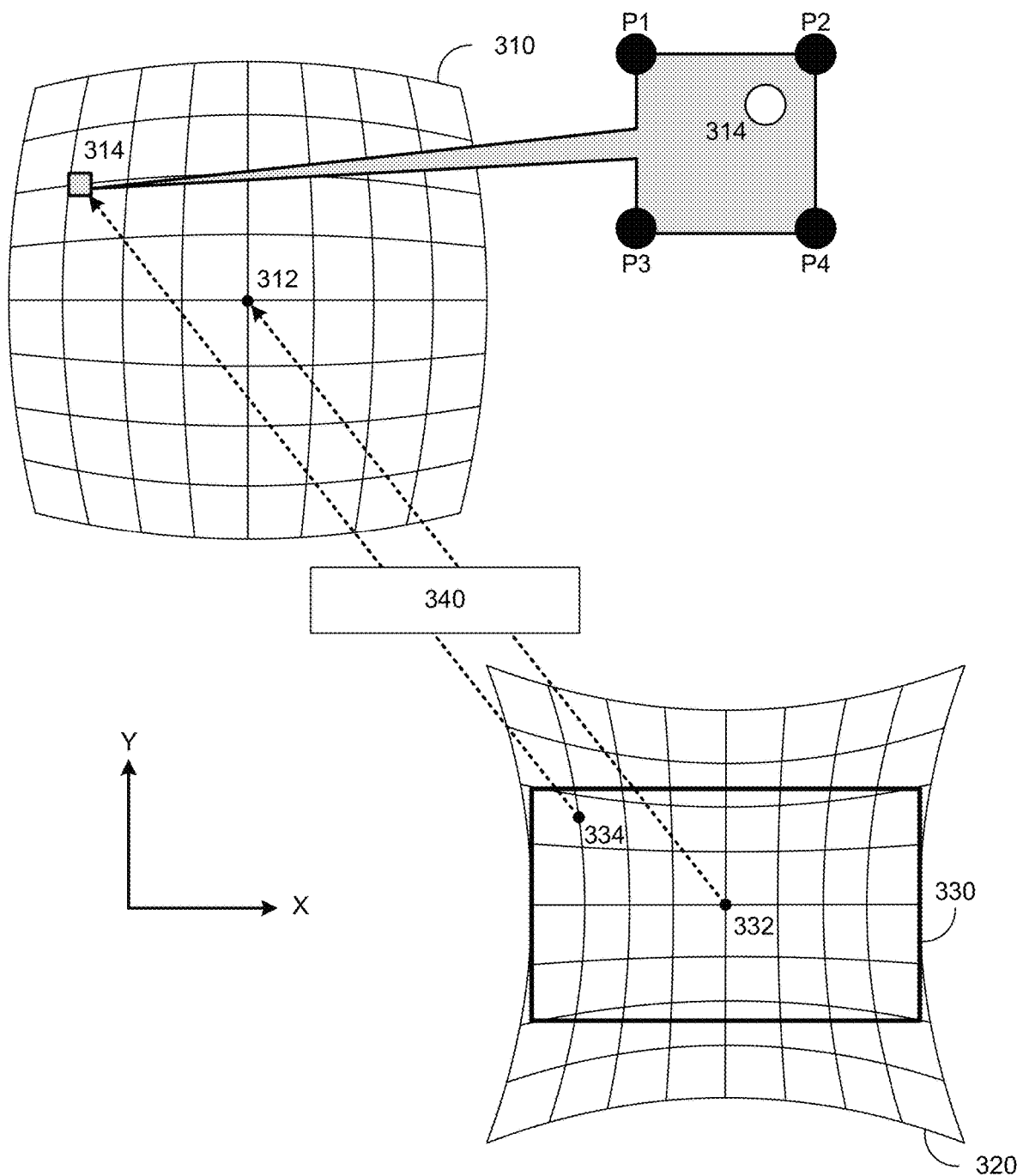
FIG. 3 illustrates distortion correction of an image frame, according to an example.

FIG. 3 illustrates distortion correction of an image frame captured by a fisheye camera, according to an example. A fisheye camera, such as forward-facing camera 156A, captures an input image frame 310 of a field of view that is projected onto a spherical surface. As illustrated, the distortion increases as the distance from the center of image frame 310 increases. As a result of the distortion, straight lines in the real world will appear as curved lines in image frame 310.

Thus, distortion correction may be applied to distorted image frame 310 to produce a corrected image frame 320. For example, the distortion correction may comprise rectilinear projection that maps pixels in image frame 310 from a spherical surface onto a flat surface to produce corrected image frame 320. Such distortion correction may be implemented based on the Scaramuzza fisheye camera model. As a result of the distortion correction, the central region of image frame 320 may appear natural. However, as the distance from the center of image frame 320 increases, the objects in image frame 320 will begin to appear unnatural. For instance, objects near the edges of image frame 320 will appear unnaturally stretched, with greater stretching as the distance to the edges decreases.

Thus, image frame 320 will typically be cropped to final image frame 330. However, to maintain a wide field of view, less cropping may be performed along the horizontal X-axis than along the vertical Y-axis. In other words, the width is greater than the height in the aspect ratio of final image frame 330. This may be beneficial in the remote operation of mobile equipment 110, since more relevant information is available from a wider image than from a taller image, as most obstacles will be at ground level.

In practice, the aspect ratio and resolution of final image frame 330 are known in advance. The aspect ratio and resolution may be defined in accordance with the particular design goals, and may depend on the capabilities of camera(s) 156, the computational resources available at mobile equipment 110 (e.g., within ECU 140), the bandwidth available from communication module 154 and/or in network 170A, the computational resources available at platform 180, the computational resources and/or display capabilities at remote terminal 190, and/or the like. Typical aspect ratios include 32:9, 21:9, 16:9, 16:10, 4:3, and the like. Typical resolutions for a 32:9 aspect ratio include 3840×1080 pixels, 5120×1440 pixels, and the like. Typical resolutions for a 21:9 aspect ratio include 2560×1080 pixels, 3440×1440 pixels, 5120×2160 pixels, and the like. Typical resolutions for a 16:9 aspect ratio include 1280×720 pixels, 1366×768 pixels, 1600×900 pixels, 1920×1080 pixels (High Definition), 2560×1440 pixels, 3840×2160 pixels (Ultra High Definition), 4096×2160 pixels (4k), 5120×2880 pixels (5k), 7680×4320 pixels (8k), and the like. Typical resolutions for a 4:3 aspect ratio include 1280×1024 pixels, 1400×1050 pixels, 1440×1080 pixels, 1600×1200 pixels, 1920×1440 pixels, 2048×1536 pixels, and the like.

In distortion correction, a distortion correction model 340 is applied to each final pixel coordinate in final image frame 330 to determine how to calculate the pixel at that final pixel coordinate from distorted image frame 310. It should be understood that it is not necessary to generate the entire corrected image frame 320 and then crop it to final image frame 330. Rather, the distortion correction may iterate through every pixel coordinate in final image frame 330 to generate the pixel at that pixel coordinate from distorted image frame 310 based on distortion correction model 340. The cropping is inherently obtained by the fact that only the pixels within final image frame 330 are generated, whereas pixels outside of final image frame 330 are never generated.

Distortion correction model 340, which may implement the Scaramuzza fisheye camera model, may comprise a pixel mapping, which maps every pixel coordinate in final image frame 340 to a position in distorted image frame 310. In some cases, a pixel coordinate in final image frame 330 may map to a single pixel in distorted image frame 310, especially in or near the center of corrected image frame 320. For example, pixel coordinate 332, which is at the center of both final image frame 330 and corrected image frame 320, may map to a pixel 312, which is at the center of distorted image frame 310. In this case, the pixel at pixel coordinate 332 may be generated by copying the pixel value at pixel coordinate 312 from distorted image frame 310 to pixel coordinate 332 in final image frame 330.

However, in many cases, especially with increasing distance from the center of corrected image frame 320, a pixel coordinate in final image frame 330 will correspond to a pixel coordinate in corrected image frame 320 that is not represented by a single pixel. In this case, the pixel may be calculated based on two or more pixels in distorted image frame 310. For example, pixel coordinate 334, which is near the edge of both final image frame 330 and corrected image frame 320, may map to a pixel coordinate 314 between a plurality of pixels in distorted image frame 310. In this case, the pixel at pixel coordinate 334 may be generated by interpolating a value from the values of the pixels that surround pixel coordinate 314. The interpolation may weight the values of pixels that are closer to mapped pixel coordinate 314 higher than the value of pixels that are farther from mapped pixel coordinate 314. For example, given a pixel coordinate 314 surrounded by pixels P1, P2, P3, and P4, as illustrated in FIG. 3, the pixel at pixel coordinate 332 may be interpolated from the values of P1, P2, P3, and P4.

In this interpolation, since pixel coordinate 314 is closer to P2 than P1, P3, and P4, more weight can be given to the value of P2. In addition, since pixel coordinate 314 is the same distance from P1 and P4, equal weight can be given to the values of P1 and P4, and since P3 is farthest from pixel coordinate 314, the least amount of weight can be given to the value of P3. However, it should be understood that this is just one example, and the disclosed embodiments do not depend on any particular method of interpolation.

Figure 4:
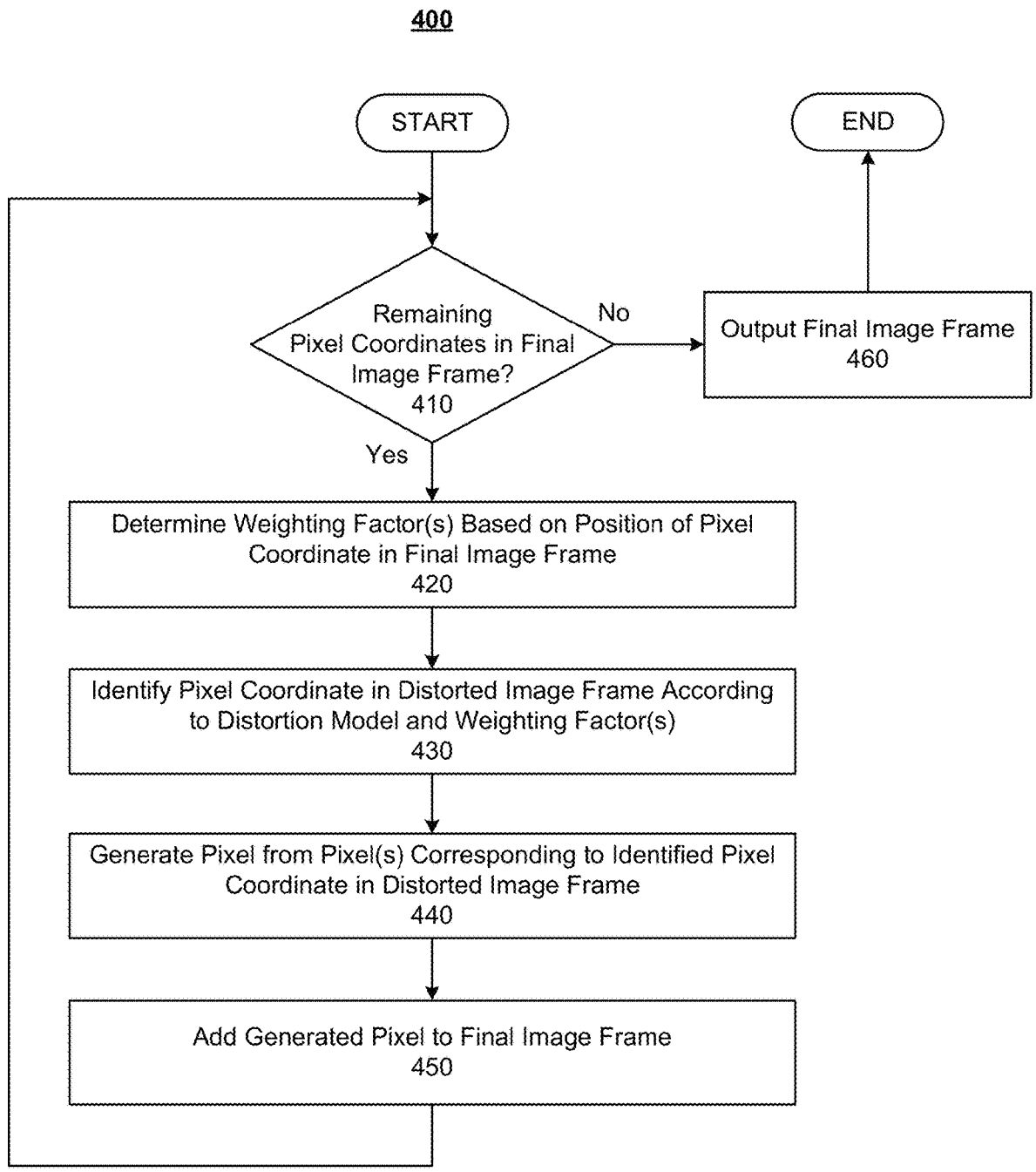
FIG. 4 illustrates a process for variable distortion correction for panoramic images, according to an embodiment.

FIG. 4 illustrates a process 400 for variable distortion correction for panoramic images, according to an embodiment. While process 400 is illustrated with a certain arrangement and ordering of subprocesses, process 400 may be implemented with fewer, more, or different subprocesses and a different arrangement and/or ordering of subprocesses. It should be understood that any subprocess, which does not depend on the completion of another subprocess, may be executed before, after, or in parallel with that other independent subprocess, even if the subprocesses are described or illustrated in a particular order.

It is contemplated that process 400 is executed on mobile equipment 110. In particular, process 400 may be executed by ECU 140 or another processing device on mobile equipment 110. While process 400 could be executed remotely on an external system, such as platform 180 or remote terminal 190, process 400 can reduce the amount of data in the video by converting input image frames 310 into final image frames 330 with generally fewer pixels. Thus, performance of process 400 on-board mobile equipment 110 can reduce the amount of data that must be transmitted over network 170A. In an alternative embodiment, a portion of process 400 could be executed on mobile equipment 110, while another portion of process 400 is executed on an external system. However, it should be understood that process 400 can be implemented as a relatively computationally inexpensive process using a pixel map, and therefore, should be capable of being entirely executed on mobile equipment 110.

Process 400 may be executed for each image frame in each video that is captured by one or more camera(s) 156. For example, forward-facing camera 156A, right-side-facing camera 156B, left-side-facing camera 156C, and/or rear-facing camera 156D may be fisheye cameras with very wide-angle fields of view (e.g., 120-degrees to 180-degrees). Process 400 may be executed for each image frame from each video captured by each fisheye camera.

In subprocess 410, process 400 determines whether or not any remaining pixel coordinates remain in final image frame 330 for which a pixel has not yet been generated. If pixel coordinates remain to be considered in final image frame 330 (i.e., "Yes" in subprocess 410), process 400 performs subprocesses 420-450. Otherwise, if no pixel coordinates remain to be considered in final image frame 330 (i.e., "No" in subprocess 410), process 400 performs subprocess 460 and then ends. In other words, an iteration of subprocesses 420-450 is performed for each pixel coordinate in final image frame 330. In general, each iteration of subprocesses 420-450 for a given pixel coordinate can be performed independently of each iteration of subprocesses 420-450 for any other pixel coordinate. Thus, it should be understood that iterations of subprocesses 420-450 for different pixel coordinates may be performed either in parallel or serially. In addition, it should be understood that the total number of pixels that are considered in each iteration of process 400 will depend on the resolution of final image frame 330.

In subprocess 420, process 400 determines one or more weighting factors to be used, based on the position of pixel coordinate in final image frame 330. For example, a first weighting factor may be determined for the X-axis and/or a second weighting factor may be determined for the Y-axis. In an embodiment, a weighting factor is only determined for the X-axis and not the Y-axis. In an alternative embodiment, a weighting factor is only determined for the Y-axis and not the X-axis. In another alternative embodiment, a weighting factor is determined for both the X-axis and the Y-axis.

In all cases, the weighting factor that is determined for a given axis may be based on the position of the pixel coordinate along that axis. Weighting factors will be described herein as indicating a level of distortion correction. For instance, each weighting factor may be represented as a value from 0.0 to 1.0, with 0.0 indicating no distortion correction, and 1.0 indicating full distortion correction. In general, the weighting factor may decrease as the distance from the center of final image frame 330 increases along the respective axis. However, this is not a requirement of any embodiment. As an example, if weighting is applied to the X-axis, central pixel coordinate 332 in final image frame 330 may have a weighting factor of 1.0 indicating full distortion correction, and the weighting factor may decrease in both directions along the X-axis as the distance from central pixel coordinate 332 increases, such that the weighting factor is at a minimum at both edges of final image frame 330 along the X-axis. Similarly, if weighting is applied to the Y-axis, central pixel coordinate 332 in final image frame 330 may have a weighting factor of 1.0 indicating full distortion correction, and the weighting factor may decrease in both directions along the Y-axis as the distance from central pixel coordinate 332 increases, such that the weighting factor is at a minimum at both edges of final image frame 330 along the Y-axis. It should be understood that the weighting factors and distributions of weighting factors along the X-axis and the Y-axis may be the same or different. The weightings may be continuous along the respective axis or may be discrete.

In an alternative embodiment, the weighting factor could indicate a level of distortion, instead of a level of distortion correction. In this case, the weighting factor may be represented as a value from 0.0 to 1.0, with 0.0 indicating full distortion correction, and 1.0 indicating no distortion correction. It should be understood that any of the disclosed embodiments may be easily adapted to this alternative definition of the weighting factor via a simple conversion. In particular, in the case that the range 0.0 to 1.0 is used, a weighting factor indicating a level of distortion can be easily substituted in place of a weighting factor indicating a level of distortion correction by simply subtracting the weighting factor indicating a level of distortion from 1.0. In addition, in the case of a weighting factor that indicates a level of distortion, instead of a level of distortion correction, embodiments that are described with weighting factors that decrease from the center of final image frame 330 will instead have weighting factors that increase from the center of final image frame 330.

Figure 5:
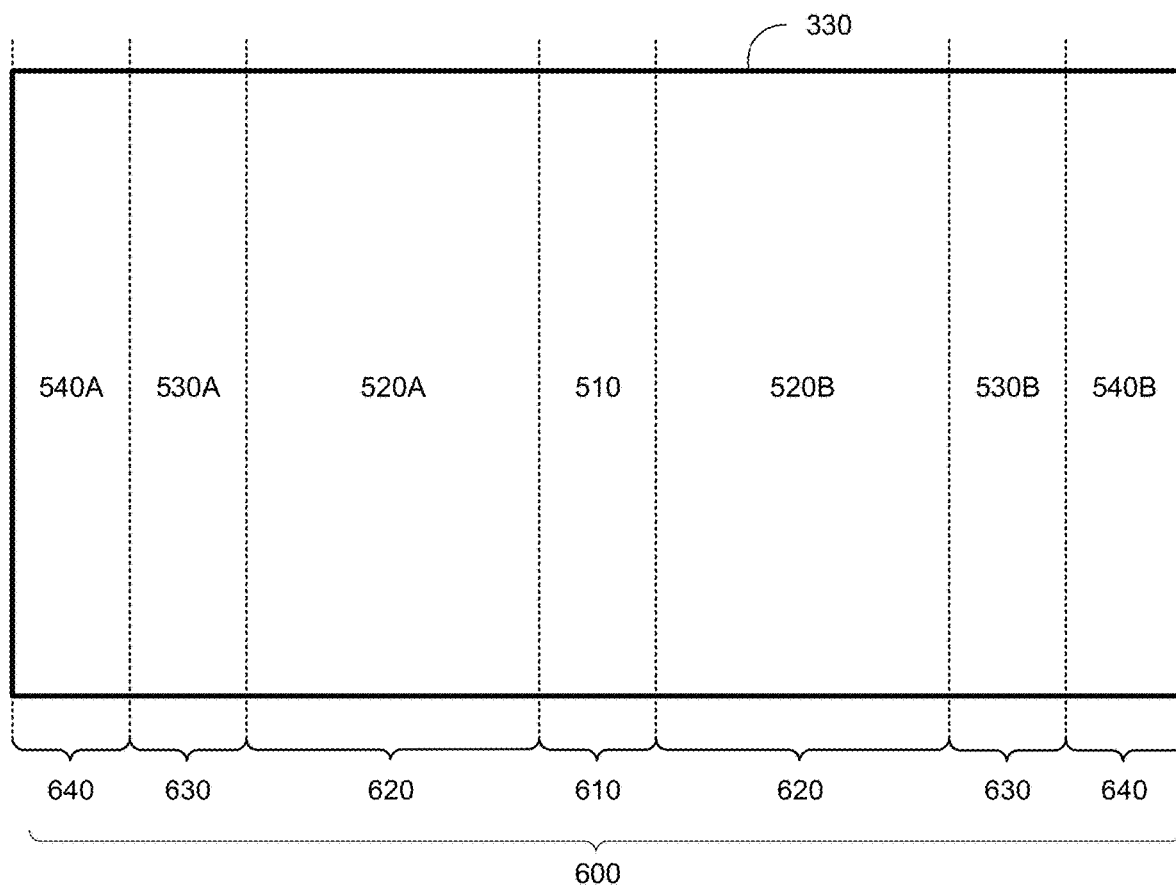
FIG. 5 illustrates an example weighting for variable distortion correction, according to an embodiment.

FIG. 5 illustrates an example of discrete weighting along the X-axis, according to an embodiment. It should be understood that discrete weighting may be similarly configured along the Y-axis. In the illustrated embodiment, final image frame 330 is divided into seven discrete sections, including a central section 510, sections 520A, 530A, and 540A in order from central section 510 to the left edge of final image frame 330, and sections 520B, 530B, and 540B in order from central section 510 to the right edge of final image frame 330. Each section may be the same size or different sizes. For example, as illustrated, central section 510 may represent 10% of the width of final image frame 330, sections 520A and 520B may each represent 25% of the width of final image frame 330, and sections 530A, 530B, 540A, and 540B may each represent 10% of the width of final image frame 330.

Each discrete section may be associated with a discrete weighting factor 600, with sections that are the same distance from central section 510 having the same weighting factor 600. For example, central section 510 is associated with a weighting factor 610, sections 520A and 520B are both associated with a weighting factor 620, sections 530A and 530B are both associated with a weighting factor 630, and sections 540A and 540B are both associated with a weighting factor 640. In an embodiment in which the weighting factor indicates a level of distortion correction, weighting factors 600 decrease as the distance from central section 610 increases, and increase as the distance from the edge of final image frame 330 increases along the respective axis. As on example, weighting factor 610 is 1.0, weighting factor 620 is 0.9, weighting factor 630 is 0.8 and weighting factor 640 is 0.6.

It should be understood that the illustrated sections and associated weighting factors 600 are merely examples, and that other divisions of sections and associations of weighting factors 600 are possible. Similar sections, with associated weighting factors 600, may be implemented along the Y-axis of final image frame 330, in addition to or instead of along the X-axis of final image frame 330. Furthermore, it should be understood that the sections may be minimized to a single line of pixels, such that each column and/or row of pixels in final image frame 330 has its own associated weighting factor. Alternatively, weighting factors 600 may be implemented as an algorithm that receives an x-coordinate and/or y-coordinate for a pixel coordinate in final image frame 330 and returns a weighting factor associated with that x-coordinate and/or y-coordinate.

In any case, each pixel coordinate in final image frame 330 will be associated with at least one weighting factor 600 that depends on the pixel coordinate's position within final image frame 330. The weighting factor(s) 600 associated with each pixel coordinate may comprise a weighting factor 600 that depends on the pixel coordinate's position along the X-axis of final image frame 330 and/or a weighting factor 600 that depends on the pixel coordinate's position along the Y-axis of final image frame 330.

In subprocess 430, a pixel coordinate in distorted image frame 310 is identified according to distortion model 340 and weighting factors 600. In particular, the pixel mapping of distortion model 340 is modified on a regional or pixel-by-pixel basis by weighting factors 600. Using the example illustrated in FIG. 5, the mapping of pixel coordinates in region 510 of final image frame 330 will be modified by weighting factor 610, the mapping of pixel coordinates in regions 520A and 520B of final image frame 330 will be modified by weighting factor 620, the mapping of pixel coordinates in regions 530A and 530B of final image frame 330 will be modified by weighting factor 630, and the mapping of pixel coordinates in regions 540A and 540B of final image frame 330 will be modified by weighting factor 640.

In an embodiment, each weighting factor 600 represents a percentage of distortion correction to be applied. For example, a weighting factor of 1.0 will apply 100% of the distortion correction to a pixel coordinate, a weighting factor of 0.5 will apply 50% of the distortion correction to a pixel coordinate, and a weighting factor of 0.0 will apply no distortion correction to a pixel coordinate. Conceptually, variable distortion correction projects distorted image frame 310 from a spherical surface onto a variably and arbitrarily definable curved surface. This is in contrast to conventional distortion correction which projects distorted image frame 310 onto a flat surface.

To explain an embodiment of subprocess 430 in mathematical terms, a pixel coordinate in final image frame 330, within the coordinate system of corrected image frame 320, will be denoted $(x_2, y_2)$, and the corresponding pixel coordinate in distorted image frame 310 that is identified in subprocess 430 will be denoted $(x_1, y_1)$. Final image frame 330 has a predefined aspect ratio and represents an image plane that is perpendicular to the focal axis of the camera 156 that captured distorted image frame 310. The distance from the focal point of camera 156 is fixed to represent the focal length. For each pixel coordinate $(x_2, y_2)$ in final image frame 330, the pixel mapping of distortion model 340 will produce a pixel coordinate $(x_m, y_m)$ in distorted image frame 310. It should be understood that pixel coordinate $(x_m, y_m)$ represents the pixel coordinate that would correspond to pixel coordinate $(x_2, y_2)$ if full distortion correction were applied along both the X-axis and Y-axis. However, the level of distortion correction is varied based on the weighting factors $(w_x, w_y)$, corresponding to weighting factors 600, that were determined for pixel coordinate $(x_2, y_2)$ in subprocess 420 based on the position of pixel coordinate $(x_2, y_2)$ in final image frame 330. It should be understood that weighting factor $w_x$ is the weighting factor determined for pixel coordinate $(x_2, y_2)$ based on its position along the X-axis, and weighting factor $w_y$ is the weighting factor determined for pixel coordinate $(x_2, y_2)$ based on its position along the Y-axis. Weighting factors $w_x$ and $w_y$ can be independent of each other, such that their values may be different or the same. The pixel coordinate $(x_1, y_1)$ can be identified in subprocess 430 as follows:

$$x_1 = x_m + (1-w_x)(x_2 - x_m)$$

$$y_1 = y_m + (1-w_y)(y_2 - y_m)$$

$$0 \leq w_x \leq 1$$

$$0 \leq w_y \leq 1$$

For example, if weighting factor $w_x$ is 1.0, $x_1 = x_m$. In other words, the distortion correction is fully applied. At the other end of the spectrum, if weighting factor $w_x$ is 0.0, $x_1 = x_2$. In other words, no distortion correction is applied. It should be understood that any weighting factor $0.0 < w_x < 1.0$ will result in partial distortion correction being applied by proportionally scaling $x_1$ between $x_m$ and $x_2$. The same principles apply to weighting factor $w_y$ in the determination of $y_1$.

Figure 6:
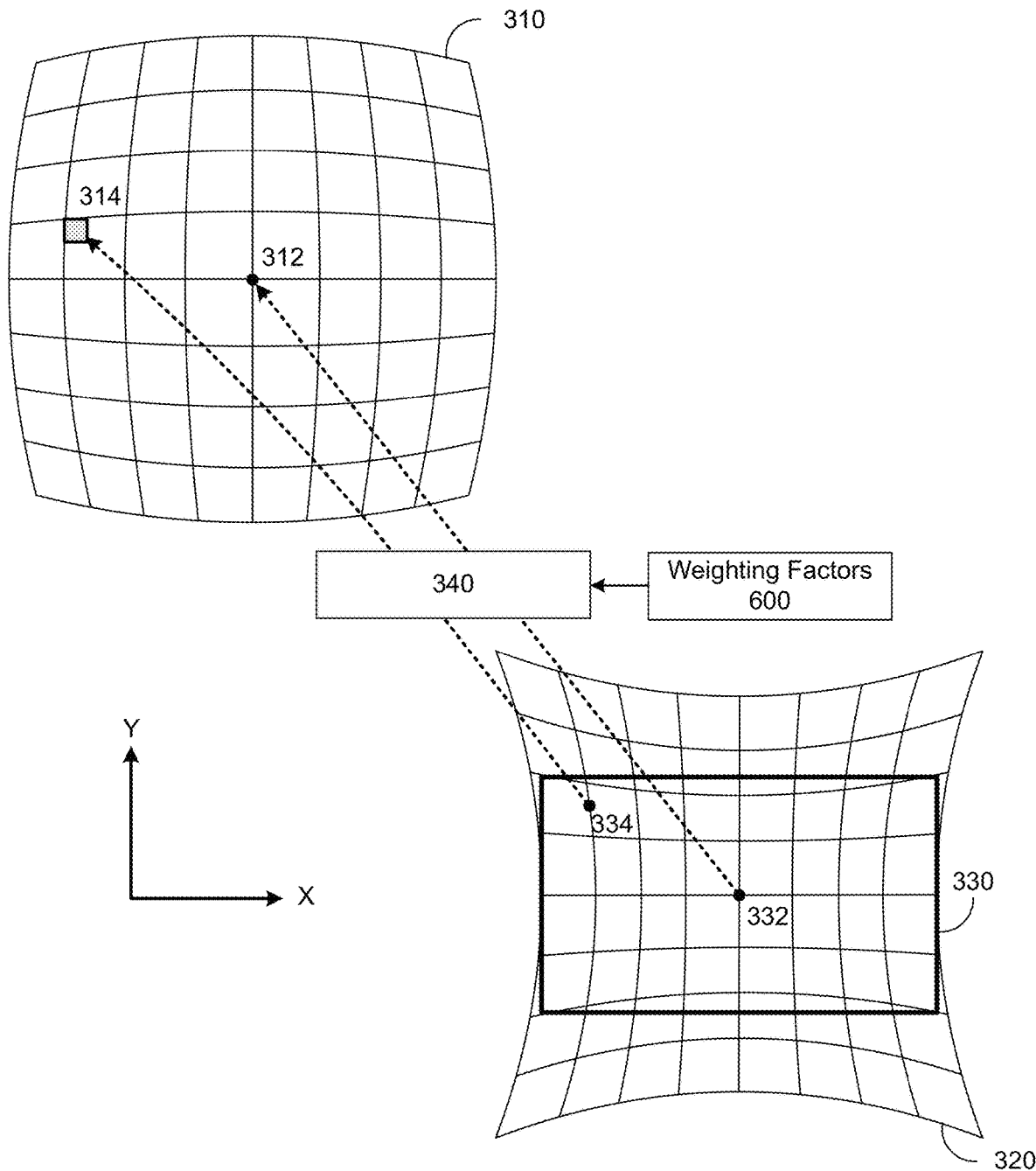
FIG. 6 illustrates variable distortion correction of an image frame, according to an embodiment.

FIG. 6 illustrates variable distortion correction of an image frame captured by a fisheye camera, according to an embodiment. As illustrated, in subprocess 430, weighting factors 600 are applied to distortion model 340, such that a different level of distortion correction is applied to different pixel coordinates in the portion of corrected image frame 320 that is included in final image frame 330. As discussed elsewhere herein, the contemplated applications for variable distortion correction will generally vary the distortion correction such that the highest level of distortion correction is at the center of final image frame 330 and gradually decreases outward, along at least the X-axis, to the lowest level of distortion correction at the edges of final image frame 330. However, this is not a requirement, and the distortion correction may be varied in other manners and patterns using the disclosed embodiments.

In an embodiment, tangential correction may be applied to correct tangential distortion, if any. Tangential distortion occurs when the image plane is not perpendicular to the focal axis, for example, due to misalignment between the sensor and lens in camera 156. In this case, an affine transform, which may be determined during calibration of camera 156, may be applied to pixel coordinate $(x_1, y_1)$ to correct for the tangential distortion. As a result of this transformation, the value of pixel coordinate $(x_1, y_1)$ may shift or otherwise change. In any case, the final pixel coordinate $(x_1, y_1)$ is output by subprocess 430 to subprocess 440.

Although subprocesses 420 and 430 are illustrated as separate subprocesses, subprocesses 420 and 430 could be implemented by modifying the pixel map of distortion model 340 to account for the weighting factors 600. In other words, the pixel map may be calculated in advance to variably apply distortion correction for the pixel coordinates in final image frame 330. In this case, a single lookup in the precalculated pixel map for a given pixel coordinate in final image frame 330 can accomplish the functions of both subprocesses 420 and 430. However, if it is subsequently desired to adjust weighting factors 600, the pixel map would have to be recalculated.

In subprocess 440, a pixel is generated for the pixel coordinate $(x_2, y_2)$ in final image frame 330 based on the corresponding pixel coordinate $(x_1, y_1)$ in distorted image frame 310 that was identified in subprocess 430. In some cases, the value of pixel coordinate $(x_1, y_1)$ may correspond to a precise pixel coordinate in distorted image frame 310. In this case, the value of pixel coordinate $(x_2, y_2)$ may be derived (e.g., copied) from the value of the pixel at pixel coordinate $(x_1, y_1)$. However, in many cases, the value of pixel coordinate $(x_1, y_1)$ will not correspond to a precise pixel coordinate in distorted image frame 310. For example, the values of $x_1$ and/or $y_1$ may be non-integer values. In this case, as discussed elsewhere herein, the value of the pixel for pixel coordinate $(x_2, y_2)$ may be interpolated from the values of the pixels at the nearest pixel coordinates to $(x_1, y_1)$. For example, if the value of $x_1$ lies between two x coordinates, along the X-axis, in distorted image frame 310, the value of the pixel for pixel coordinate $(x_2, y_2)$ may be interpolated based on the values of the pixels at these two x coordinates, proportional to the distance of $x_1$ from each of these two x coordinates. Similarly, if the value of $y_1$ lies between two y coordinates, along the Y-axis, in distorted image frame 310, the value of the pixel for pixel coordinate $(x_2, y_2)$ may be interpolated based on the values of the pixels at these two y coordinates, proportional to the distance of $y_1$ from each of these two y coordinates.

In subprocess 450, the pixel that was generated in subprocess 440 is added to final image frame 330 at the pixel coordinate $(x_2, y_2)$ under consideration. In other words, a pixel coordinate in final image frame 330 is filled in with a value over each iteration of subprocesses 420-450. Once all pixel coordinates in final image frame 330 have been considered, final image frame 330 will comprise a pixel value at all pixel coordinates.

In subprocess 460, the completed final image frame 330, with variable distortion correction, is output. It should be understood that, in the case of video, process 400 may be performed in real time on each image frame in the video, as it is captured. Iterations of process 400 will result in a video with variable distortion correction. As discussed elsewhere herein, this video may be transmitted to a remote terminal 190, such that a remote operator can view the video and operate mobile equipment 110 accordingly.

INDUSTRIAL APPLICABILITY

Some applications, such as the remote operation of a mobile equipment 110, can benefit from panoramic video with a very wide field of view and low distortion. In many cases, to reduce costs, a fisheye camera 156 is used to obtain the video with a very wide field of view, resulting in fisheye distortion. Fisheye distortion can be disorienting to a remote operator, since, for example, straight lines in the real world may appear as curved lines in the video, especially as the distance from the center of the video increases. While fisheye distortion can be corrected for a narrow field of view, regions of corrected video with a very wide field of view will look unnatural, especially as the distance from the center of the video increases. In particular, objects in the video will look increasingly stretched as the distance from the center of the video increases. To avoid this unnatural appearance, the video is typically cropped near the edges, thereby reducing the field of view.

Disclosed embodiments enable video to be captured using a fisheye camera 156, while retaining a very wide field of view and reducing the unnatural appearance near the edges of the video. In particular, variable distortion correction is applied to image frames in the video, for example, using process 400, such that different levels of distortion correction are applied to different regions in the video. Conceptually, instead of the conventional projection of the image from a spherical surface of the fisheye lens onto a flat surface, the image is projected from the spherical surface onto an arbitrarily curved surface and cropped to the desired aspect ratio. In an embodiment, only fisheye distortion correction is varied in this variable manner. Tangential distortion correction may be applied uniformly to the entire image frame before variable distortion correction is applied.

The level of distortion correction that is applied to the pixels in the video may be varied such that the level of distortion correction is greatest in the center of the video and decreases as the distance from the center increases, reaching a minimum at the edges of the video. Thus, the central region of the video is substantially free of fisheye distortion, while the edges of the video may remain fully or partially distorted. As a result, a remote operator has an undistorted view of the area towards which mobile equipment 110 is traveling, but retains a maximum field of view to survey the peripheral environment. While fisheye distortion remains in the periphery of the video, it is not as disorienting to the remote operator since the remote operator is generally focused on the central region of the video. In addition, as a result of the very wide field of view, the ability of the remote operator to detect the presence of potential obstacles in his or her peripheral vision is maximized.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine or camera. Hence, although the present embodiments are, for convenience of explanation, depicted and described as being implemented in mobile equipment for industrial applications and for fisheye cameras, it will be appreciated that it can be implemented in various other types of mobile equipment and machines and/or for other types of cameras, and in various other systems and environments, including other image-processing applications. Furthermore, there is no intention to be bound by any theory presented in any preceding section. It is also understood that the illustrations are not necessarily drawn to scale and may include exaggerated dimensions and graphical representation to better illustrate the referenced items shown, and are not considered limiting unless expressly stated as such. In other words, the features disclosed in various embodiments may be implemented using different relative dimensions within and between components than those illustrated in the drawings.

What is claimed is:

1. A method comprising using at least one hardware processor to execute a process that includes, for each of a plurality of final pixel coordinates in a final image frame to be generated from an input image frame that was captured by a camera:
    determining at least one weighting factor to be used based on the final pixel coordinate in the final image frame;
    identifying an input pixel coordinate in the input image frame, based on a distortion model and the determined at least one weighting factor;
    generating a pixel value based on the identified input pixel coordinate in the input image frame; and
    adding the generated pixel value at the final pixel coordinate in the final image frame.

2. The method of claim 1, wherein the at least one weighting factor indicates a level of distortion correction, and wherein identifying an input pixel coordinate comprises identifying the input pixel coordinate in the input image frame that corresponds to an application of the indicated level of distortion correction to a mapping between the final image frame and the input image frame.

3. The method of claim 1, wherein determining at least one weighting factor to be used based on the final pixel coordinate in the final image frame comprises selecting a weighting factor associated with a position of the final pixel coordinate along at least one axis of the final image frame.

4. The method of claim 3, wherein the at least one axis comprises a horizontal axis.

5. The method of claim 3, wherein the at least one axis comprises a vertical axis.

6. The method of claim 3, wherein the at least one weighting factor comprises two weighting factors, including a first weighting factor that is selected based on the position of the final pixel coordinate along a horizontal axis of the final image frame, and a second weighting factor that is selected based on the position of the final pixel coordinate along a vertical axis of the final image frame.

7. The method of claim 3, wherein the at least one weighting factor indicates a level of distortion correction, and wherein a weighting factor associated with a position at a center of the final image frame along the at least one axis is greater than weighting factors associated with positions at opposing edges of the final image frame along the at least one axis.

8. The method of claim 7, wherein weighting factors associated with positions along the at least one axis decrease from the center towards both opposing edges.

9. The method of claim 1, wherein generating the pixel value based on the identified input pixel coordinate in the input image frame comprises, when no pixel exists at the identified input pixel coordinate in the input image frame, interpolating the pixel value based on a plurality of pixels that are closest to the identified input pixel coordinate in the input image frame.

10. The method of claim 1, further comprising using the at least one hardware processor to apply uniform tangential distortion correction for all of the plurality of final pixel coordinates.

11. The method of claim 1, further comprising using the at least one hardware processor to execute the process for a plurality of final image frames in a video.

12. The method of claim 11, wherein the at least one hardware processor is comprised in a mobile equipment, and wherein the method further comprises using the at least one hardware processor to transmit the video over a wireless network to at least one external system.

13. The method of claim 12, further comprising using the at least one hardware processor to:
    receive control commands over the wireless network from the at least one external system; and
    control one or more subsystems of the mobile equipment according to the received control commands.

14. The method of claim 1, wherein the at least one hardware processor is comprised in an electronic control unit of the mobile equipment.

15. The method of claim 1, wherein the final image frame has an aspect ratio of 21:9 or greater.

16. A mobile equipment comprising:
    at least one camera that captures video including a plurality of input image frames; and
    at least one hardware processor that, for each of a plurality of final pixel coordinates in a final image frame to be generated from each of the plurality of input image frames,
        determines at least one weighting factor to be used based on the final pixel coordinate in the final image frame,
        identifies an input pixel coordinate in the input image frame, based on a distortion model and the determined at least one weighting factor,
        generates a pixel value based on the identified input pixel coordinate in the input image frame, and
        adds the generated pixel value at the final pixel coordinate in the final image frame.

17. The mobile equipment of claim 16, wherein the at least one weighting factor indicates a level of distortion correction, and wherein identifying an input pixel coordinate comprises identifying the input pixel coordinate in the input image frame that corresponds to an application of the indicated level of distortion correction to a mapping between the final image frame and the input image frame.

18. The mobile equipment of claim 16, wherein determining at least one weighting factor to be used based on the final pixel coordinate in the final image frame comprises selecting a weighting factor associated with a position of the final pixel coordinate along at least one axis of the final image frame, wherein the at least one weighting factor indicates a level of distortion correction, wherein a weighting factor associated with a position at a center of the final image frame along the at least one axis is greater than weighting factors associated with positions at opposing edges of the final image frame along the at least one axis, and wherein weighting factors associated with positions along the at least one axis decrease from the center towards both opposing edges.

19. The mobile equipment of claim 16, wherein the at least one camera comprises a fisheye camera.

20. A non-transitory computer-readable medium having instructions stored thereon, wherein the instructions, when executed by a processor, cause the processor to, for each of a plurality of final pixel coordinates in a final image frame to be generated from an input image frame that was captured by a camera:
- determine at least one weighting factor to be used based the final pixel coordinate in the final image frame;
- identify an input pixel coordinate in the input image frame, based on a distortion model and the determined at least one weighting factor;
- generate a pixel value based on the identified corresponding input pixel coordinate in the input image frame; and
- add the generated pixel value at the final pixel coordinate in the final image frame.

* * * * *